United States Patent Office 3,474,045
Patented Oct. 21, 1969

3,474,045
CROSS-LINKING EPIHALOHYDRIN POLYMERS
WITH THIAZOLINE-2-THIONES
Edwin J. Vandenberg, Foulk Woods, and William D.
Willis, Limestone Acres, Del., assignors to Hercules
Incorporated, Wilmington, Del., a corporation of
Delaware
No Drawing. Filed July 20, 1967, Ser. No. 654,696
Int. Cl. C08g *51/84, 23/20;* C08c *11/62*
U.S. Cl. 260—2                              17 Claims

ABSTRACT OF THE DISCLOSURE

Epihalohydrin polymers can be cross-linked by heating with a thiazoline-2-thione having the general formula:

$$\begin{array}{c} R_1 \\ | \\ R_2-CH-N \\ | \quad\quad\ \ \diagdown \\ \quad\quad\quad\quad C=S \\ | \quad\quad\ \ \diagup \\ R_3-CH-S \end{array}$$

where $R_1$ is selected from the group consisting of alkyl, cycloalkyl, aryl, alkaryl, aralkyl and hydrogen radicals and $R_2$ and $R_3$ are hydrogen or lower alkyl radicals and $R_2$ and $R_3$ may be either the same or different to produce vulcanizates of increased strength and insolubility in organic solvents useful in diverse specialty rubber applications.

---

The present invention relates to vulcanized epihalohydrin polymers and to their preparation.

Epihalohydrin polymers have been vulcanized, i.e., cross-linked in the past with polyamines alone or monoamines in the presence of at least one agent from the group sulfur, dithiocarbamates, thiuram sulfides and thiazoles, to produce rubbers that have good attributes and can be used in diverse specialty rubber applications.

Now in accordance with this invention, it has unexpectedly been found that high molecular weight polymers and copolymers of epihalohydrins can be cross-linked with at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B, and IV–A of the Periodic Table (Lange's Handbook of Chemistry, 8 pages 56–57, 1952), and a thiazoline-2-thione having the general formula:

$$\begin{array}{c} R_1 \\ | \\ R_2-CH-N \\ | \quad\quad\ \ \diagdown \\ \quad\quad\quad\quad C=S \\ | \quad\quad\ \ \diagup \\ R_3-CH-S \end{array}$$

where $R_1$ is selected from the group consisting of alkyl, cycloalkyl, aryl, alkaryl, aralkyl and hydrogen radicals and $R_2$ and $R_3$ are hydrogen or lower alkyl radicals and $R_2$ and $R_3$ may be either the same or different.

Any high molecular weight solid polymer, homopolymer or copolymer of an epihalohydrin as, for example, epichlorohydrin or epibromohydrin homopolymers, copolymers of two different epihalohydrins, or copolymers of an epihalohydrin with one or more other epoxides or oxetanes can be cross-linked to produce the new vulcanizates of this invention. These polymers are readily prepared by the polymerization of epihalohydrins with, for example, organoaluminum compounds as catalysts. Particularly effective catalysts for the polymerization of epihalohydrins are alkyl-aluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, the crystalline polymers on vulcanization tending to be hard, brittle, and lacking in elasticity. These properties are, of course, useful in the case of relatively rigid molded articles which can be prepared by molding the compounded polymer and then curing to crosslink and set it. However, excellent rubbers are obtained by vulcanizing mixtures of amorphous and crystalline polymers. In this case, the amount of the crystalline polymer is generally less than about 25–30% of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula:

where X is halogen. In the same way, when an epihalohydrin is copolymerized with one or more other epoxides or oxetanes (including other epihalohydrins), polymerization takes place through the epoxide or oxetane linkage even through other polymerizable groups may be present. Typical of epoxides and oxetanes that can be copolymerized with an epihalohydrin to produce a copolymer that can be cross-linked in accordance with this invention are the alkylene oxides such as ethylene oxide, propylene oxide, butene oxide, etc.; butadiene monoxide, cyclohexene oxide, vinyl cyclohexene oxide, epoxide ethers such as ethyl glycidyl ether, 2-chloro ethyl glycidyl ether, hexyl glycidyl ether, allyl glycidyl ether, etc.; trimethyl oxide (oxetane), alkyl substituted oxetanes, such as 2-ethyloxetane, 3-butyloxetane, 3,3-dimethyloxetane, etc.; haloalkyl substituted oxetanes such as 2-chloromethyloxetane, 3-iodopropyloxetane, etc.; alkoxy substituted oxetanes such as 2-ethoxyoxetane, 3-propoxyoxetane, etc.; alkoxyalkyl substituted oxetanes such as 2-butoxymethyloxetane, 3-hexoxymethyloxethane, etc.; haloalkoxy substituted oxetanes such as 2-bromobutoxyoxetane, 3-fluoromethoxyoxetane, etc.; haloalkoxyalkyl substituted oxetanes such as 2-chloroethyoxymethyloxetane, 3-fluoromethyoxymethyloxetane, etc. The copolymers will in general contain at least about 10% by weight of an epihalohydrin monomer.

As pointed out above, the polymers of an epihalohydrin that are vulcanized, i.e., cross-linked in accordance with this invention, are high molecular weight solid polymers. Any homopolymer or copolymer that has a Reduced Specific Viscosity of at least about 0.2, i.e., a molecular weight of at least about 40,000, can be cross-linked with the agents of this invention to yield a polymer of increased tensile strength and modulus. The term "Reduced Specific Viscosity" (RSV) which is a function of molecular weight is used herein to designate the specific viscosity measured at 100° C. on an α-chloronaphthalene solution of the polymer containing 0.1 g. per 100 ml. of solution divided by the concentration of the solution. Polymers having an RSV above about 0.2 and preferably above about 0.5 on cross-linking yield excellent general purpose specialty rubbers.

These epihalohydrin polymers generally contain a small amount (i.e., from about 0.1% to about 2% by weight) of antioxidant added at the time of their preparation. It may in some cases be desirable to add a small additional amount of antioxidant before or at the time of cross-linking the polymer. Exemplary of the most preferable antioxidants are phenyl-β-naphthylamine, di-β- naphthyl - p - phenylenediamine, sym - di-β-naphthyl-p-phenyldiamine, N-isooctyl-p-aminophenol, the reaction product of diphenylamine and acetone, polymerized trimethyldihydroquinoline, 4,4' - thio-bis(6 - tert-butyl-m-cresol), the reaction product of crotonaldehyde and 3-methyl-6-tert-butylphenol, nickel dibutyldithiocarbamate, the zinc salt of 2-mercaptobenzimidazole, etc.

Epihalohydrin polymers are cross linked in accordance with this invention by heating a mixture of the polymer, at least one metal compound as defined above and at least one thiazoline-2-thione.

Any thiazoline-2-thione having the general formula:

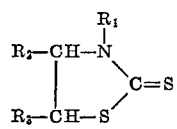

where $R_1$, $R_2$ and $R_3$ are as defined above can be used in combination with one or more of the above defined metal compounds to cross-link an epilhalohydrin polymer. Exemplary of the thiazoline-2-thiones that can be used are thiazoline-2-thione,
3-methylthiazoline-2-thione,
3-n-butylthiazoline-2-thione,
4-methyl-3-isobutylthiazoline-2-thione,
5-ethylthiazoline-2-thione,
4,5-diethyl-3-n-pentylthiazoline-2-thione,
3-decylthiazoline-2-thione,
3-phenylthiazoline-2-thione,
3-phenyl-4,5-dimethylthiazoline-2-thione,
3-p-tolylthiazoline-2-thione,
3-benzylthiazoline-2-thione,
3-(β-phenyl ethyl)-5-tert-butylthiazoline-2-thione,
3-cyclohexylthiazoline-2-thione,
3-cycloheptyl-4,5-dimethylthiazoline-2-thione,
3-(β-cyclohexyl ethyl)thiazoline-2-thione,
3-(3-methyl cyclopentyl)thiazoline-2-thione, etc.

As stated above, the thiazoline-2-thiones are effective as cross-linking agents for epihalohydrin polymers when used in combination with one or more metal compounds. These metal compounds are selected from the group consisting of salts of aromatic carboxylic acids, salts of aliphatic carboxylic acids, salts of carbonic acid, salts of phosphorous acid, salts of silicic acid and oxides of the metals of Periodic Groups II–A, II–B and IV–A. Exemplary of these metal compounds are stannous oxide, stannic oxide, lead monoxide, red lead oxide, germanium monooxide, calcium oxide, zinc oxide, magnesium oxide, zinc carbonate, lead carbonate, dibasic lead carbonate, calcium carbonate, mercuric carbonate, beryllium carbonate, lead orthosilicate, barium silicate, cadmium silicate, magnesium silicate, dibasic lead phthalate, magnesium benzoate, calcium benzoate, zinc salicylate, strontium salicylate, lead azelate, lead oleate, dibasic lead stearate, calcium stearate, lead sebacate, the lead salt of tetradecane dibasic acid, dibasic lead, phosphite, magnesium phosphite, etc.

Those metal compounds containing lead are most preferred since in addition to aiding the cross-linking they tend to increase the stability of the product against heat and oxidation degradation. Therefore, it may be desirable to add at least a small amount, i.e., from about 0.2% to about 5.0% by weight, of lead compound even when one or more other metal compounds are being used to aid in cross-linking, although desirably even larger amounts may be used. Particularly effective in improving heat aging resistance are the lead salts of aliphatic dicarboxylic acids containing from about 4 to about 14 carbon atoms, such as adipic acid, suberic acid, azelaic acid, sebacic acid, tetradecane dibasic acid, etc. These compounds may be added directly in the form of the salt or as the combination of a lead oxide such as red lead oxide with an aliphatic dicarboxylic acid, which will form the lead salt in situ. When adding the lead and the acid separately best results have been obtained when using a ratio of lead oxide to aliphatic dicarboxylic acid of from about 2.5 to about 1.8 by weight. Where the toxicity of lead compounds becomes a problem, such as in food packaging applications, a small amount, i.e., from about 0.5% to about 20% by weight, of pentaerythritol can be used to stabilize the vulcanizable compositions. Of course, there are cases in which a stabilizer is not required and excellent vulcanizates can be obtained without it.

Varied amounts of the cross-linking agents can be added and the optimum amount of each cross-linking agent will depend upon the degree of cross-linking desired, the nature of the other cross-linking agents employed, etc. Generally, the amounts added (based on the weight of the polymer) will be within the following ranges: metal compound, from about 2% to about 20%; thiazoline-2-thione, from about 0.2% to about 10%, preferably from about 0.5% to about 5.0%.

The cross-linking agents (and stabilizer if one is used) can be incorporated or admixed with the polymer in any desired fashion. For example, they can be uniformly blended with a polymer by simply milling on a conventional rubber mill or mixing in a Banbury mixer. By this means, the agents are uniformly distributed throughout the polymer and uniform cross-linking is effected when the blend is subjected to heat. It is generally preferable to mill at temperatures within the range of from about 70° F. to about 200° F. However, the blends are highly scorch-resistant below about 250° F. Other methods of admixing the cross-linking agents with the polymer will be apparent to those skilled in the art.

The conditions under which the cross-linking is effected can be varied over a wide range. Cross-linking can be effected in minutes at temperatures around 350° F. or in days at 150° F. In general, the cross-linking temperature will be within the range of from about 300° F. to about 450° F. The time will vary inversely with the temperature and will range from about 30 seconds to about 120 minutes. Cross-linking will generally be conducted in metal molds under a compression of at least about 500 p.s.i.

In addition to the cross-linking agents, other ingredients can also be incorporated. The additives commonly used in rubber vulcanization can be used here also, as, for example, extenders, fillers, pigments, plasticizers, softeners, etc. The presence of a filler and, in particular, carbon black, is beneficial and, as in rubber compounding, gives optimum results. Obviously, there are many cases in which a filler is not required or desired and excellent results are achieved when only the cross-linking agents are added.

The following examples will illustrate the process of cross-linking epihalohydrin polymers in accordance with this invention and the vulcanizates so obtained. All parts and percentages are by weight.

GENERAL PROCEDURE FOR PREPARATION OF VULCANIZATES

In all of the examples, polymer stocks were made up by mixing on a two-roll mill (rolls maintained at about 175° F.) one hundred parts of dry polymer with the specified cross-linking agents and any other additives for about 10 minutes. The polymer was first added to the mill and when it banded (within about 2 minutes) the other ingredients were added in the general order: carbon black or other filler, followed by metal compounds, followed by antioxidant, followed by the thiazoline-2-thione. Where recipes indicate omissions, the order of addition was merely advanced. All stocks were then cured in two-part steel molds for 45 minutes at 340° F. under 100 p.s.i. minimum pressure. Specimen thickness was approximately 75 mils.

The extent of cross-linking is indicated by the resulting vulcanizate's insolubility at 176° F. in toluene, which is a complete solvent for the polymers and the unvulcanized compounds. Insolubility results upon the integration of individual polymer molecules into a three dimensional cross-linked macromolecules.

Each sample of polymer used in Examples 5, 6 and 13–23 contained 1 part per hundred of phenyl-β-naphthylamine. Each sample of polymer used in Examples 1–4, 7–12 and 24–32 contained 0.5 part per hundred of the reaction product of crotonaldehyde and 3-methyl-6-tert-butylphenol.

Example 1

In this example, an epichlorohydrinethylene oxide copolymer having a reduced specific viscosity of approximately 5.0 and containing 68% by weight of epichlorohydrin, was milled and cross-linked with 3-methylthiazoline-2-thione, red lead, carbon black and a stabilizer. The amounts of the ingredients (by parts) in the formulation and the physical properties of the vulcanizate are tabulated below:

Formulation (parts):
    Epichlorohydrin-ethylene oxide copolymer --- 100
    Zinc stearate ----------------------------- 0.75
    Fast extruding furnace black -------------- 50
    Nickel dibutyl dithiocarbamate ------------ 1.0
    Red lead ---------------------------------- 5.0
    3-methylthiazoline-2-thione --------------- 2.0

Physical properties:
    Mooney Scorch (ASTM D–1077) 250° F.,
      minutes to 10 point rise ---------------- >30
    Tensile strength, p.s.i. ------------------ 1950
    Modulus at 200% elongation, p.s.i. -------- 1360
    Elongation, percent ----------------------- 300
    Shore $A_2$ hardness ---------------------- 70

A sample of the copolymer was milled and cross-linked exactly as described above except 2 parts of 2-mercaptoimidazoline was substituted for the 3-methylthiazoline-2-thione. This example had a Mooney scorch (minutes to 10 point rise when run at 250° F.) of 14.

Examples 2–4

In these examples, an epichlorohydrin-ethylene oxide copolymer having a reduced specific viscosity of 3.8 and containing 50 mole percent ethylene oxide was milled and cross-linked with 3-methylthiazoline-2-thione, silica filler, whitening and metal oxides. The amounts of the ingredients (by parts) in each formulation and the physical properties of the vulcanizates are given in Table I.

TABLE 1

|  | Examples | | |
| --- | --- | --- | --- |
|  | 2 | 3 | 4 |
| Epichlorohydrinethylene oxide copolymer | 100 | 100 | 100 |
| Zinc stearate | 0.75 | 0.75 | 0.75 |
| Fumed silica | 30 | 30 | 30 |
| Glycidoxy propyl trimethoxysilane | 2.0 | 2.0 | 2.0 |
| Zinc oxide | 2.0 | 2.0 | 2.0 |
| Calcium stearate | 2.0 | 2.0 | 2.0 |
| Magnesium oxide |  |  | 2.0 |
| Titanium dioxide (whitening) | 5.0 | 5.0 | 5.0 |
| 3-methylthiazoline-2-thione | 2.0 | 3.0 | 2.0 |
| Mooney Scorch (ASTM D–1077) 275° F. minutes to 5 point rise | 41 | 22 | 41 |
| Modulus at 300% elongation p.s.i. | 525 | 745 | 730 |
| Tensile strength, p.s.i. | 2,015 | 2,620 | 1,995 |
| Elongation, percent | 1,020 | 940 | 870 |
| Shore $A_2$ Hardness | 60 | 63 | 66 |

Example 5

Amorphous polyepichlorohydrin having a reduced specific viscosity of approximately 2.0 was compounded with certain metal oxides, thiazoline-2-thione, carbon black and cross-linked. The formulation used is tabulated below.

Formulation: Parts
    Polyepichlorohydrin ----------------------- 100
    Fast extruding furnace black -------------- 50
    Magnesium oxide --------------------------- 5.0
    Zinc oxide -------------------------------- 5.0
    Thiazoline-2-thione ----------------------- 2.5

The resulting vulcanizate has good physical properties.

Example 6

In this example, amorphous polyepichlorohydrin as described in Example 5 was milled and cross-linked with magnesium oxide, zinc oxide and 3-methylthiazoline-2-thione and the extent of vulcanization compared with a control wherein sulfur was substituted for the 3-methylthiazoline-2-thione. The amounts of the ingredients (by parts) in each formulation, along with the solubility of the vulcanizate in toluene, are given in Table II.

TABLE II

|  | Control a | Example 6 |
| --- | --- | --- |
| Polyepichlorohydrin | 100 | 100 |
| Magnesium oxide | 4.5 | 4.5 |
| Zinc Oxide | 4.5 | 4.5 |
| 3-methylthiazoline-2-thione |  | 2.5 |
| Sulfur | 2.0 |  |
| Solubility | (1) | (2) |

[1] Completely soluble.
[2] Insoluble.

Examples 7–12

In these examples, the epichlorohydrin-ethylene oxide copolymer described in Example 1 was milled and cross-linked with 3-methylthiazoline-2-thione, and the extent of cross-linking compared with controls where one or more of the various agents were omitted. The amounts of the ingredients (by parts) in each formulation, along with the solubility of each vulcanizate in toluene, are given in Table III.

TABLE III

|  | Controls | | | | | Examples | | | | | |
| --- | --- | --- | --- | --- | --- | --- | --- | --- | --- | --- | --- |
|  | a | b | c | d | e | 7 | 8 | 9 | 10 | 11 | 12 |
| Epichlorohydrinethylene oxide copolymer | 100 | 100 | 100 | 100 | 100 | 100 | 100 | 100 | 100 | 100 | 100 |
| 3-methylthiazoline-2-thione |  | 2.5 |  |  |  | 2.5 | 2.5 | 2.5 | 2.5 | 2.5 | 2.5 |
| Stannous oxide |  |  | 9 |  |  | 4.5 | 4.5 |  | 9 |  |  |
| Plumbous oxide |  |  |  | 9 |  | 4.5 |  | 4.5 |  | 9 |  |
| Calcium oxide |  |  |  |  | 9 |  | 4.5 | 4.5 |  |  | 9 |
| Solubility | (Completely soluble) | | | | | (Insoluble) | | | | | 9 |

Examples 13–18

In these examples, the polyepichlorohydrin described in Example 5 was milled and cross-linked with metal compounds and various amounts of 3-methylthiazoline-2-thione. The amounts of the ingredients (by parts) in each formulation, along with the solubility of each vulcanizate in toluene are given in Table IV.

TABLE IV

|  | Examples | | | | | |
| --- | --- | --- | --- | --- | --- | --- |
|  | 13 | 14 | 15 | 16 | 17 | 18 |
| Polyepichlorohydrin | 100 | 100 | 100 | 100 | 100 | 100 |
| Zinc stearate | 0.75 | 0.75 | 0.75 | 0.75 | 0.75 | 0.75 |
| Red lead ($Pb_3O_4$) | 5.0 | 5.0 | 5.0 | 5.0 | 5.0 | 5.0 |
| Zinc oxide | 1.0 | 1.0 | 1.0 | 1.0 | 1.0 | 1.0 |
| 3-methylthiazoline-2-thione | 0.3 | 0.5 | 1.0 | 1.5 | 3.0 | 6.0 |
| Solubility | (1) | (1) | (2) | (2) | (2) | (2) |

[1] Partially soluble.
[2] Insoluble.

Examples 19–23

In these examples the polyepichlorohydrin described in Example 5 was milled and cross-linked with metal compounds and different thiazoline - 2 - thiones. The amounts of the ingredients (by parts) in each formulation along with the solubility of each vulcanizate in toluene are given in Table V.

TABLE V

|  | Control a | 19 | 20 | 21 | 22 | 23 |
|---|---|---|---|---|---|---|
| Polyepichlorohydrin | 100 | 100 | 100 | 100 | 100 | 100 |
| Dibasic lead phthalate | 5.0 | 5.0 | 5.0 | 5.0 | 5.0 | 5.0 |
| Zinc oxide | 4.5 | 4.5 | 4.5 | 4.5 | 4.5 | 4.5 |
| 3-phenylthiazoline-2-thione |  | 2.5 |  |  |  |  |
| 3-ethyl-4-methylthiazoline-2-thione |  |  | 2.5 |  |  |  |
| 3-benzylthiazoline-2-thione |  |  |  | 2.5 |  |  |
| 3 (p-tolyl)-5-methylthiazoline-2-thione |  |  |  |  | 2.5 |  |
| 3-cyclohexylthiazoline-2-thione |  |  |  |  |  | 2.5 |
| Solubility [1] | CS | I | I | I | I | I |

[1] CS=Completely soluble; I=Insoluble.

Examples 24–29

In these examples, an amorphous polyepichlorohydrin having a reduced specific viscosity of approximately 2.3 was milled and cross-linked with 3-methyl-thiazoline-2-thione, various lead salts, an antioxidant and carbon black. The amounts of the ingredients (by parts) in each formulation are given in Table VI.

TABLE VI

|  | 24 | 25 | 26 | 27 | 28 | 29 |
|---|---|---|---|---|---|---|
| Polyepichlorohydrin | 100 | 100 | 100 | 100 | 100 | 100 |
| Fast extruding furnace black | 50 | 50 | 50 | 50 | 50 | 50 |
| Polymerized trimethyl-dihydroquinoline | 1.0 | 1.0 | 1.0 | 1.0 | 1.0 | 1.0 |
| 3-methylthiazoline-2-thione | 2.0 | 2.0 | 2.0 | 2.0 | 2.0 | 2.0 |
| Dibasic lead carbonate | 5.0 |  |  |  |  |  |
| Lead carbonate |  | 5.0 |  |  |  |  |
| Dibasic lead stearate |  |  | 5.0 |  |  |  |
| Lead o-silicate |  |  |  | 5.0 |  |  |
| Lead oleate |  |  |  |  | 5.0 |  |
| Dibasic lead phosphite |  |  |  |  |  | 5.0 |

Each vulcanizate has good physical properties and good heat aging stability.

Example 30

In this example, the polyepichlorohydrin described in Example 5 was compounded with a metal compound, 3-methylthiazoline-2-thione, carbon black, stabilized with pentaerythritol and cross-linked. The amounts of the ingredients (by parts) in the formulation are tabulated below.

Formula: Parts
Polyepichlorohydrin _____ 100
Fast extruding furnace black _____ 50
3-methylthiazoline-2-thione _____ 2.5
Pentaerythritol _____ 10
Zinc oxide _____ 5.0

The resulting vulcanizate has good physical properties and good heat-aging stability.

Example 31

In this example, an epichlorohydrin-propylene oxide copolymer having a reduced specific viscosity of 8.9 and containing 20% by weight of propylene oxide was compounded with 3-phenylthiazoline-2-thione, red lead, azelaic acid, carbon black, antioxidant and cross-linked. The amounts of the ingredients (by parts) in the formulation are tabulated below.

Formula: Parts
Epichlorohydrin-propylene oxide copolymer ___ 100
Fast extruding furnace black _____ 50
Polymerized trimethyl dihydroquinoline _____ 1.0
Red lead _____ 5.0
Azelaic acid _____ 2.0
3-phenylthiazoline-2-thione _____ 2.5

The resulting vulcanizate has good physical properties and excellent heat-aging stability.

Example 32

In this example, an epichlorohydrin-trimethylene oxide copolymer having a reduced specific viscosity of 3.9 and containing 12% by weight trimethylene oxide was compounded with 3-methylthiazoline-2-thione, metal oxides, carbon black and cross-linked. The formulation used is tabulated below.

Formulation: Parts
Epichlorohydrin-trimethylene oxide copolymer _____ 100
Fast extruding furnace black _____ 50
Zinc stearate _____ 0.75
Red lead (Pb$_3$O$_4$) _____ 2.0
Zinc oxide _____ 2.0
3-methylthiazoline-2-thione _____ 2.0

The resulting vulcanizate has good physical properties.

What we claim and desire to protect by Letters Patent is:

1. A cross-linked polymer of an epihalohydrin prepared by heating a polymer of an epihalohydrin having a molecular weight of at least about 40,000 in the presence of at least one metal compound selected from the group consisting of salts of aromatic carboxylic acids, salts of saturated aliphatic carboxylic acids, salts of carbonic acid, salts of phosphorous acid, salts of silicic acid and oxides of the metals selected from the group consisting of beryllium, magnesium, calcium, strontium, barium, zinc, cadmium, mercury, germanium, tin, and lead and at least one thiazoline-2-thione having the general formula:

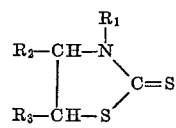

where $R_1$ is a substituent selected from the group consisting of alkyl, cycloalkyl, aryl, alkaryl, aralkyl and hydrogen substituents and $R_2$ and $R_3$ are substituents selected from the group consisting of hydrogen and lower alkyl substituents, said epihalohydrin polymer being selected from the group consisting of homopolymers of epihalohydrins, copolymers of an epihalohydrin with at least one other vicinal epoxide, and copolymers of an epihalohydrin with at least one oxetane.

2. The composition of claim 1 wherein the epihalohydrin polymer is polyepichlorohydrin.

3. The composition of claim 1 wherein the epihalohydrin polymer is a copolymer of epichlorohydrin and ethylene oxide.

4. The composition of claim 1 wherein the epihalohydrin polymer is a copolymer of epichlorohydrin and propylene oxide.

5. The composition of claim 1 wherein the metal compound included at least one lead compound selected from the group consisting of lead salts of aromatic carboxylic acids, lead salts of aliphatic carboxylic acids, lead salts of carbonic acid, lead salts of phosphorous acid, lead salts of silicic acid and lead oxides.

6. The process of cross-linking a polymer of an epihalohydrin having a molecular weight of at least about 40,000 which comprises heating said polymer in the presence of at least one metal compound selected from the group consisting of salts of aromatic carboxylic acids, salts of saturated aliphatic carboxylic acids, salts of carbonic acid, salts of phosphorous acid, salts of silicic acid and oxides of the metals selected from the group consisting of beryllium, magnesium, calcium, strontium, barium, zinc, cadmium, mercury, germanium, tin, and lead and at least one thiazoline-2-thione having the general formula:

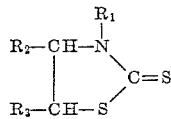

where $R_1$ is a substituent selected from the group consisting of alkyl, cycloalkyl, aryl, alkaryl, aralkyl and hydrogen substituents and $R_2$ and $R_3$ are substituents selected from the group consisting of hydrogen and lower alkyl substituents, said epihalohydrin polymer being selected from the group consisting of homopolymers of epihalohydrins, copolymers of an epihalohydrin with at least one other vicinal epoxide, and copolymers of an epihalohydrin with at least one oxetane.

7. The process of claim 6 wherein the epihalohydrin polymer is polyepichlorohydrin.

8. The process of claim 7 wherein the polyepichlorohydrin is cross-linked in the presence of 3-methylthiazoline-2-thione and a lead oxide.

9. The process of claim 6 wherein the epihalohydrin polymer is a copolymer of epichlorohydrin and ethylene oxide.

10. The process of claim 9 wherein said copolymer is cross-linked by heating in the presence of 3-methylthiazoline-2-thione and a mixture of red lead, azelaic acid and nickel dibutyl dithiocarbamate.

11. The process of claim 6 wherein the epihalohydrin polymer is a copolymer of epichlorohydrin and propylene oxide.

12. The process of claim 6 wherein the metal compound includes at least one lead compound selected from the group consisting of lead salts of aromatic carboxylic acids, lead salts of aliphatic carboxylic acids, lead salts of carbonic acid, lead salts of phosphorous acid, lead salts of silicic acid and lead oxides.

13. A cross-linkable composition comprising
(a) a polymer of an epihalohydrin having a molecular weight of at least about 40,000 selected from the group consisting of homopolymers of epihalohydrins, copolymers of an epihalohydrin with at least one other vicinal epoxide, and copolymers of an epihalohydrin with at least one oxetane,
(b) at least one thiazoline-2-thione having the general formula:

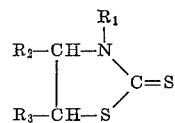

where $R_1$ is a substituent selected from the group consisting of alkyl, cycloalkyl, aryl, alkaryl, aralkyl and hydrogen substituents and $R_2$ and $R_3$ are substituents selected from the group consisting of hydrogen and lower alkyl substituents and
(c) at least one metal compound selected from the group consisting of salts of aromatic carboxylic acids, salts of saturated aliphatic carboxylic acids, salts of carbonic acid, salts of phosphorous acid, salts of silicic acid and oxides of the metals selected from the group consisting of beryllium, magnesium, calcium, strontium, barium, zinc, cadmium, mercury, germanium, tin, and lead.

14. The composition of claim 13 wherein the epihalohydrin polymer is polyepichlorohydrin.

15. The composition of claim 13 wherein the epihalohydrin polymer is a copolymer of epichlorohydrin and ethylene oxide.

16. The composition of claim 13 wherein the epihalohydrin polymer is a copolymer of epichlorohydrin and propylene oxide.

17. The composition of claim 13 wherein the metal compound includes at least one lead compound selected from the group consisting of lead salts of aromatic carboxylic acids, lead salts of aliphatic carboxylic acids, lead salts of carbonic acid, lead salts of phosphorous acid, lead salts of silicic acid and lead oxides.

References Cited
UNITED STATES PATENTS
3,135,705  6/1964  Vandenberg.
3,370,051  2/1968  Sullivan et al. _____ 260—306.7

WILLIAM H. SHORT, Primary Examiner

T. PERTILLA, Assistant Examiner

U.S. Cl. X.R.

260—79, 88.3